United States Patent [19]
Boll et al.

[11] Patent Number: 5,723,958
[45] Date of Patent: Mar. 3, 1998

[54] ARRANGEMENT FOR OPERATING A CONSUMER IN A MOTOR VEHICLE

[75] Inventors: Leonhard Boll, Eberdingen; Klaus Müller, Asperg, both of Germany

[73] Assignee: Robert Bosch GmbH, Stuttgart, Germany

[21] Appl. No.: 602,769

[22] PCT Filed: Aug. 4, 1994

[86] PCT No.: PCT/DE94/00903

§ 371 Date: Mar. 4, 1996

§ 102(e) Date: Mar. 4, 1996

[87] PCT Pub. No.: WO95/07572

PCT Pub. Date: Mar. 16, 1995

[30] Foreign Application Priority Data

Sep. 4, 1993 [DE] Germany ............ 43 29 919.9

[51] Int. Cl.⁶ .................................. H02P 7/29
[52] U.S. Cl. .................. 318/432; 318/433; 318/434; 318/293; 388/909
[58] Field of Search ................ 318/287, 288, 318/291, 293, 432, 433, 434; 388/809, 811, 816, 819, 907.2, 907.5, 909

[56] References Cited

U.S. PATENT DOCUMENTS

| | | |
|---|---|---|
| 4,439,806 | 3/1984 | Brajder. |
| 4,528,486 | 7/1985 | Flaig et al. .................. 318/254 |
| 4,951,188 | 8/1990 | Peter et al. . |
| 4,972,133 | 11/1990 | Hirota et al. .................. 318/646 |
| 5,218,339 | 6/1993 | Schrumpf et al. . |

FOREIGN PATENT DOCUMENTS

| | | |
|---|---|---|
| 0060331 | 9/1982 | European Pat. Off. . |
| 3936484 | 5/1991 | Germany . |
| 4038199 | 6/1992 | Germany . |

OTHER PUBLICATIONS

"Direkter Relais–Ersatz" by Walter Bucksch et al, Elektronik, vol. 42, No. 13, Jun. 1993, Munchen, DE, pp. 86 to 90.

Primary Examiner—Bentsu Ro
Attorney, Agent, or Firm—Walter Ottesen

[57] ABSTRACT

An arrangement for driving a consumer in a vehicle is suggested. The arrangement has at least two switch elements for influencing the current flow through the consumer. For each switch element, the current flowing through this switch element is monitored and evaluated for detecting a short circuit.

16 Claims, 3 Drawing Sheets

ARRANGEMENT FOR OPERATING A CONSUMER IN A MOTOR VEHICLE

BACKGROUND OF THE INVENTION

U.S. Pat. No. 4,951,188 discloses an arrangement for operating a consumer in a vehicle. There, an output stage is a bridge circuit having four switching elements is suggested. The current passing through the consumer, which is connected in the bridge diagonal branch, is detected and compared to pregiven threshold values. If the current through the consumer exceeds a pregiven maximum value, then a short circuit is assumed in the region of the consumer and the output stage is switched off in such a manner that a switch-on pulse-duty factor of 1% results for carrying out an emergency operation. Short-term disturbances can occur, for example, by disturbing radiation. Even for these short-term disturbances, the output stage can be switched off with this procedure and an emergency operation initiated. In this way, the availability of the arrangement is limited.

SUMMARY OF THE INVENTION

It is therefore an object of the invention to provide an arrangement for operating a consumer wherein the availability is improved especially in connection with short-term disturbances without affecting the operational reliability of the arrangement.

According to a second aspect of the invention, the arrangement for operating the consumer is to be configured in such a manner that an integration of the entire arrangement in one component is made possible. The coupling of this component to a microcomputer for driving an electric positioning motor in combination with the adjustment of a power adjusting element of an internal combustion engine such as a throttle flap or a diesel injection pump is made possible.

Short disturbances in the area of an arrangement for operating a consumer are detected with the procedure according to the invention. However, these disturbances do not necessarily lead to an unwanted effect on the operation so that the availability of the arrangement is considerably improved.

It is especially advantageous that the current through each switching element of the arrangement is detected and is checked as to whether the current exceeds a pregiven maximum value.

A time component is started when the maximum current is exceeded and a fault is only then detected when the maximum current is exceeded for a pregiven time. In this way, short-term disturbances do not lead to a switch-off of the arrangement. The fault detection takes place independently of the clocked driving signal.

In this way, errors are also detected when the drive signal continuously exhibits a high level or a low level.

It is further advantageous that the operational reliability of the arrangement is not affected by counting the detected short disturbances and by a fault reaction when there is a pregiven number of detected disturbances.

In this context, it is further advantageous that current-limiting means are provided which limit the current through the particular switching element to a pregiven maximum value so that a rapid reaction even for short-term disturbances takes place which avoids unwanted operating conditions and yet does not limit the availability of the arrangement; whereas, a long-term check ensures operational reliability by detecting the disturbances and by counting the detected disturbances during a longer continuous fault case and/or by means of the time condition.

For a clocked drive, it is especially advantageous that the switch element, which is detected as being defective during a drive pulse, is again switched on with the next drive pulse when the fault counter has not yet reached the predetermined counter position.

Decrementing the fault counter for correctly operating switch elements leads in an advantageous manner to the situation that distributed faults do not lead to a switch-off. These distributed faults occur at different time points during the operating duration of the system.

An integration into a standard IC-housing is made possible by the advantageous assembly of the drive arrangement without undertaking restrictions with respect to the extent of operation. This leads to a very economical and reliable component.

In addition to the above-outlined current monitoring with the provided reaction measures, it is especially advantageous to provide a supplement with additional protective mechanisms such as an undervoltage protection, overvoltage protection, overtemperature protection and/or a monitoring of the voltage at the charging pump of the switch elements which switch the supply voltage.

Furthermore, it is advantageous that a microcomputer can, under specific preconditions, can again switch on a drive unit detected as defective while decrementing the fault counter. The microcomputer can, in the case of a fault, attempt to restart the output stage a few times.

If the counter counts, for example to 10, the fault counter is filled after 400 microseconds for an assumed clock frequency of the computer of 25 kHz. This means that, for a temporary fault case (for example EMV) in the millisecond range, the counter is immediately filled. For this reason, it is purposeful that the microcomputer attempts at least once to again start the output stage in that the microcomputer decrements the fault counter. This procedure has been shown to be exceptionally advantageous.

Special advantages result from the procedure of the invention with the application for driving a direct-current motor or a step motor for actuating a power adjusting element of an internal combustion engine.

BRIEF DESCRIPTION OF THE DRAWINGS

The invention will be explained in greater detail with respect to the embodiments shown in the drawing. Thus, FIG. 1 shows an overview block circuit diagram of a control system equipped with an arrangement according to the invention, whereas

DESCRIPTION OF THE PREFERRED EMBODIMENTS OF THE INVENTION

Figure 1:
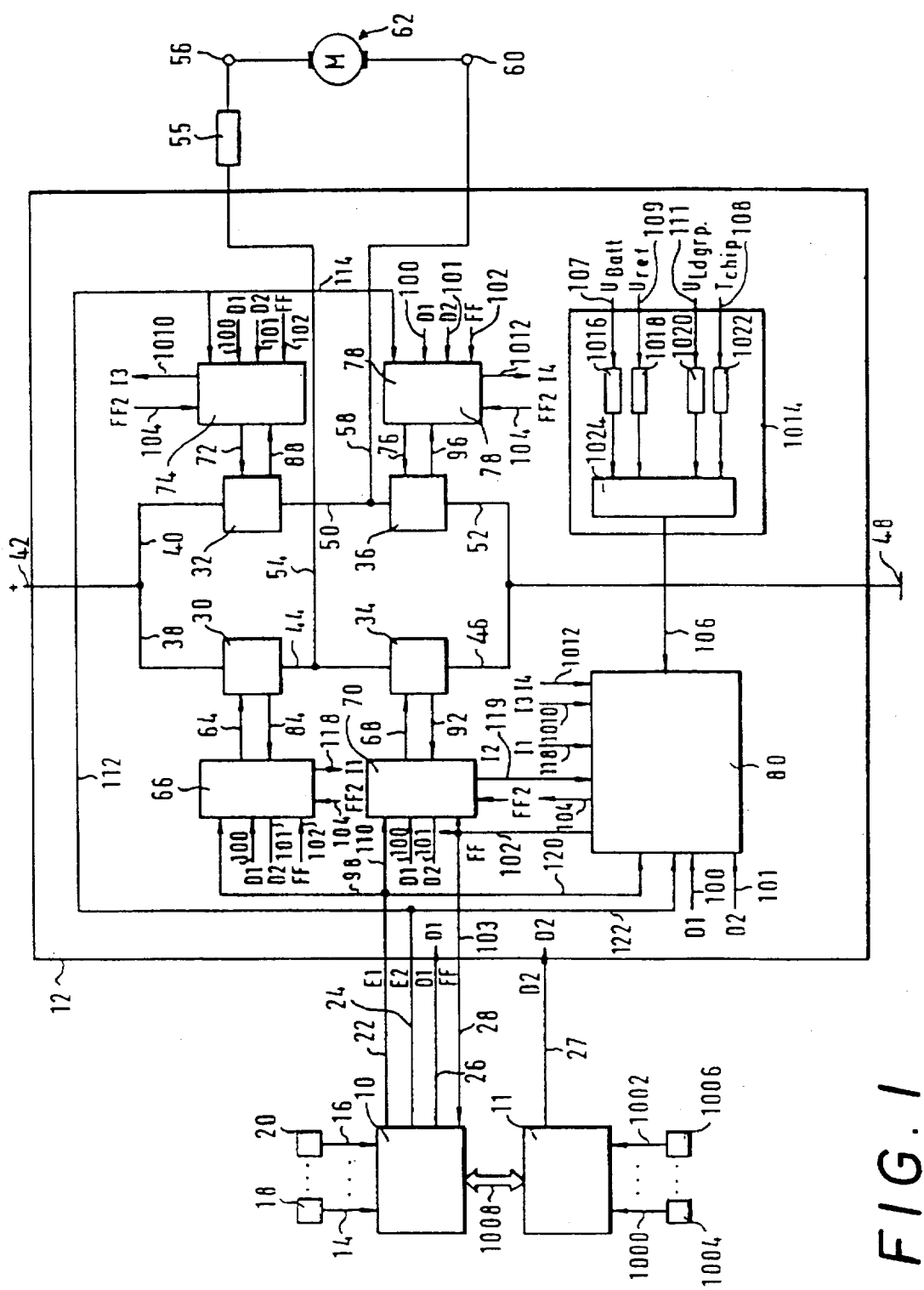

FIG. 1 shows a microcomputer 10 as well as an arrangement 12 for operating a consumer 62. The microcomputer 10 has the input lines 14 to 16 which connect the computer to measuring devices 18 to 20. A first drive line 22 and a second drive line 24 connect the microcomputer 10 to the inputs E1 and E2, respectively, of the arrangement 12. In the preferred embodiment of the drive of a motor, the signal supplied to the input E2 or E1 is obtained by inverting the signal outputted onto the lines 22 and 24, respectively. A further connecting line 26 connects the microcomputer 10 to the input D1 of the arrangement 12. Furthermore, a connecting line 28 connects the output FF of the arrangement 12 to the microcomputer 10. In addition, a second microcomputer 11 is provided which is connected via the line 27 to the input D2 of arrangement 12. This second computer has, in the preferred embodiment, other tasks (gasoline injection and ignition). For this purpose, input lines 1000 to 1002 are connected thereto from measuring devices 1004 to 1006. The microcomputers 10 and 11 exchange data and control variables via a bus system 1008.

The preferred embodiment of the arrangement 12 shown in FIG. 1 is advantageously configured as an integrated component and includes a full-bridge output stage for driving an electro-magnetic consumer which is arranged in the diagonal of the bridge circuit. The bridge circuit shown includes four switch elements 30, 32, 34, 36 which, in the preferred embodiments, are configured as MOS field effect transistors.

A connecting point of switch element 30 and a connecting point of switch element 32 are connected to the positive pole 42 of the operating voltage via the lines 38 and 40, respectively. The second connecting point of the switch element 30 is connected to the first connecting point of switch element 34 via a connecting line 44. The other connecting point of switch element 34 is, in turn, connected to the negative pole 48 of the operating voltage via the line 46. In a comparable manner, the second connecting point of the switch element 42 is coupled via the line 50 to the first connecting point of the switch element 36 and the other connecting point of the switch element 36 is connected via the line 52 to the negative pole 48 of the operating voltage. A line 54 leads from the connecting line 44 via a current detecting resistor 55 to the connecting point 56 of the arrangement 12; whereas, a line 58 leads from the line 50 to the second connecting point 60 of the arrangement 12. The consumer 62 is connected between the connecting points 56 and 60.

In the preferred embodiment, the consumer is a direct-current motor, whereas, in other embodiments, the consumer 62 can be the winding of a step motor in a likewise advantageous manner. For the step motor application, an arrangement 12 is provided for each phase and each arrangement is connected to the microcomputers in the manner shown.

A drive element is assigned to each of the switch elements (30, 32, 34, 36) to actuate the drive elements. The drive elements are connected to the control connections of the switch elements. Thus, the line 64 connects the drive element 66 to the switch element 30, the line 68 connects the drive element 70 to the switch element 34, the line 72 connects the drive element 74 to the switch element 32 and the line 76 connects the drive element 78 to the switch element 36. The assembly of the drive elements is described below with respect to FIG. 2.

The switch elements are so-called current-sensing MOS-FETs. These switch elements have an output via which a signal is outputted which represents the current flowing through the switch elements. These output lines are connected to the drive element assigned to the particular switch element. The measurement line 84 leads from the switch element 30 to the drive element 66, the measurement line 88 leads from the switch element 32 to the drive element 74, the measurement line 92 leads from the switch element 34 to the drive element 70 and the measurement line 96 leads from the switch element 36 to the drive element 78.

In the preferred example shown in FIG. 1, additional input lines are connected to the drive elements for actuating the respective assigned switch elements. The drive element 66 is connected via the line 98 to the input E1 of the arrangement 12. In addition, a line 110 is connected from the input E1 of the arrangement 12 (that is, from the line 98) to drive element 70 via an inverter (not shown). A line 112 leads from input E2 to drive element 74; whereas, a line 114 leads from the same input (that is, from the line 112) to drive element 78 via an inverter (not shown).

Figure 3:
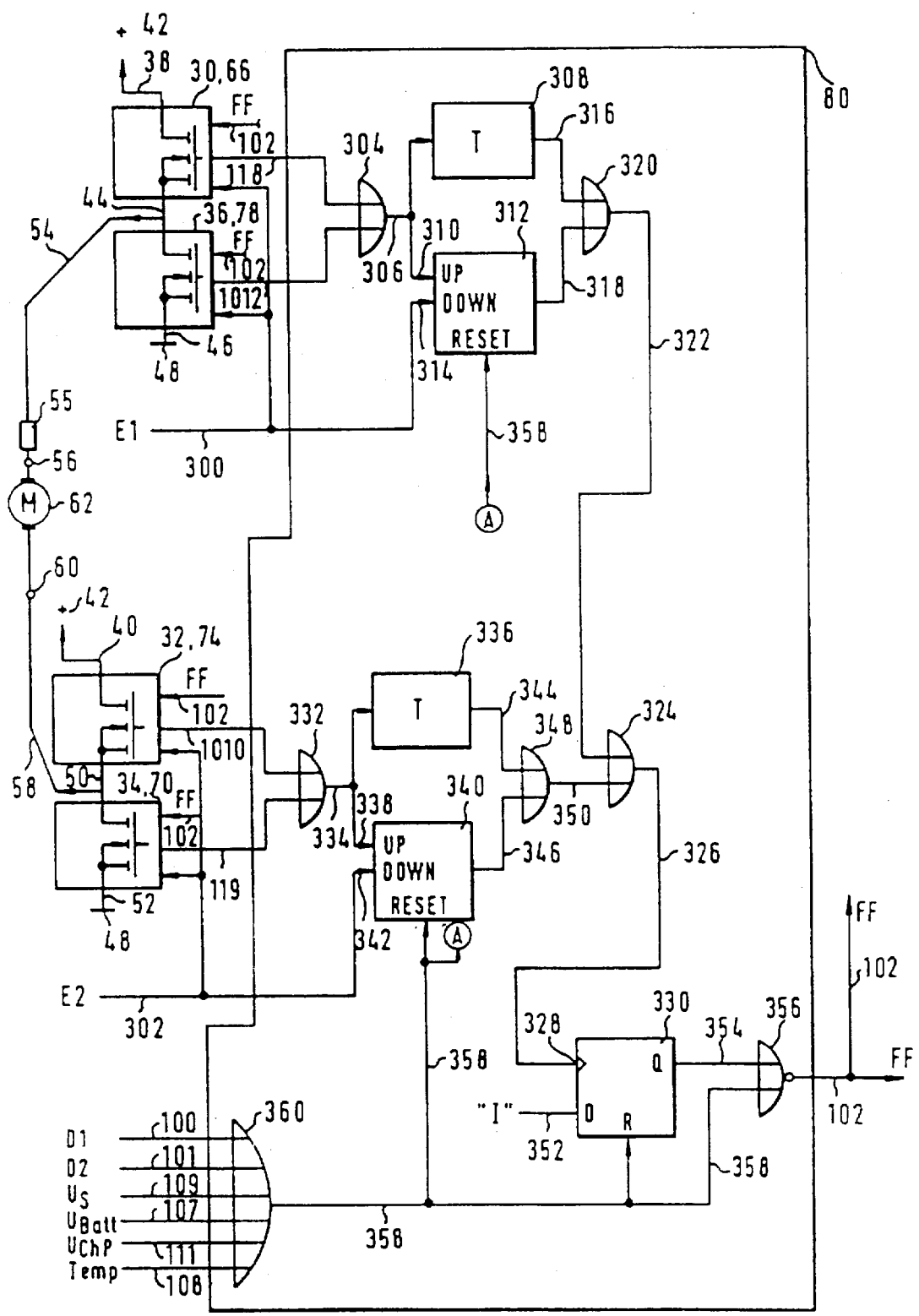

In another advantageous embodiment and as shown in FIG. 3, the switch elements 30 and 36 can be connected to E1 and the switch elements 32 and 34 can be connected to E2 in a conventional manner.

In addition, the drive element 66 is connected via a line 100 to the input D1 of arrangement 12. In a like manner, the input D1 is connected, as required from the line 100, to the other drive elements 70, 74 and 78 which is shown in FIG. 1 with the same reference numerals.

In a preferred embodiment, a second microcomputer 11 is present which is connected via the input D2 of arrangement 12 in the same manner to the elements of the arrangement 12 as the input D1 (see line 101). For reasons of reliability, the microcomputer affords the possibility to switch the output stage off and to again switch the output stage on. The computer 11 then does not control the output stage. The computer 11 can, for example, be a computer for controlling gasoline injection and/or ignition. The input signals on the inputs D1 and D2 are logically OR-coupled in the arrangement 12.

A further component of the arrangement 12 defines the monitoring unit 80. This monitoring unit is multiply connected to the drive elements which is only sketched in FIG. 1 for reasons of clarity.

A line 102 (FF) connects the monitoring unit 80 to the drive elements. In addition, a line 103 connects the line 102 to the output FF of the arrangement 12. The connecting line 104 (FF2), shown in phantom outline, connects, in an advantageous embodiment, the monitoring unit 80 to all drive elements.

Furthermore, the lines 118 (I1), 119 (I2), 1010 (I3), 1012 (I4) connect the monitoring unit 80 to the drive elements 66, 70, 74, 78.

The line 106 is also connected to the monitoring unit 80. This line connects the unit 80 to a unit 1014 which can also be a component of the unit 80 and carries out further fault monitorings. A measure for the operating voltage is supplied via the line 107 to the unit 1014. A measure for the temperature of the arrangement 12 (of the chip, of the substrate) is supplied via a line 108. A measure for the reference voltage is supplied via line 109 and a measure for the voltage of the charging pump of the switch elements 30 and 32 is supplied via the line 111. These values are compared to upper and/or lower limits in the comparator elements 1016, 1018, 1020, 1022 and the respective output signals are OR-coupled (gate 1024). The output line of the gate 1024 is the line 106.

Lines 120 and 122 connect the monitoring unit 80 to the inputs E1 and E2. Furthermore, the unit 80 is connected to the inputs D1 and D2 (lines 100, 101).

The principal way in which the arrangement in FIG. 1 operates is shown below with respect to the preferred application of an electronic motor power control for controlling a throttle flap of an internal combustion engine. The motor 62 or the step motor equipped with the winding 62 is connected to the throttle flap. Operating variables such as accelerator pedal position, engine rpm, engine temperature, et cetera, are supplied from the measuring devices 18 to 20 are supplied to the microcomputer 10 via the input lines 14 to 16. The microcomputer 10 determines on the basis of these operating values a drive signal for the arrangement and this signal is supplied via the lines 22 and 24 in the form of a pulsewidth-modulated pulse signal. A desired value for the drive signal can also be supplied from the microcomputer 11. This drive signal is adjusted by the computer 10 in the context of a position control.

The drive signals are then inverse with respect to each other. Stated otherwise, with the control signal applied to E1, either the switch element 30 is switched on or the switch element 34 is switched off as a consequence of the inverter or vice versa. In a similar manner, the switch element 32 is switched off at the same time by the signal applied to the input E2 and the switch element 36 is switched on by the inverter. This permits a rapid current buildup and current reduction and therefore a precise positioning of the motor.

For normal operation, the following operating states of the arrangement 12 are given:

|   |    |    | Switch Elements |    |    |    |              |
|---|----|----|----|----|----|----|--------------|
| D | E1 | E2 | 30 | 32 | 34 | 36 | Effect       |
| 0 | X  | X  | A  | A  | A  | A  | OFF          |
| 1 | 0  | 0  | A  | A  | E  | E  | free running |
| 1 | 0  | 1  | A  | E  | E  | A  | neg. current |
| 1 | 1  | 0  | E  | A  | A  | E  | pos. current |
| 1 | 1  | 1  | E  | E  | A  | A  | free running |

Figure 2:
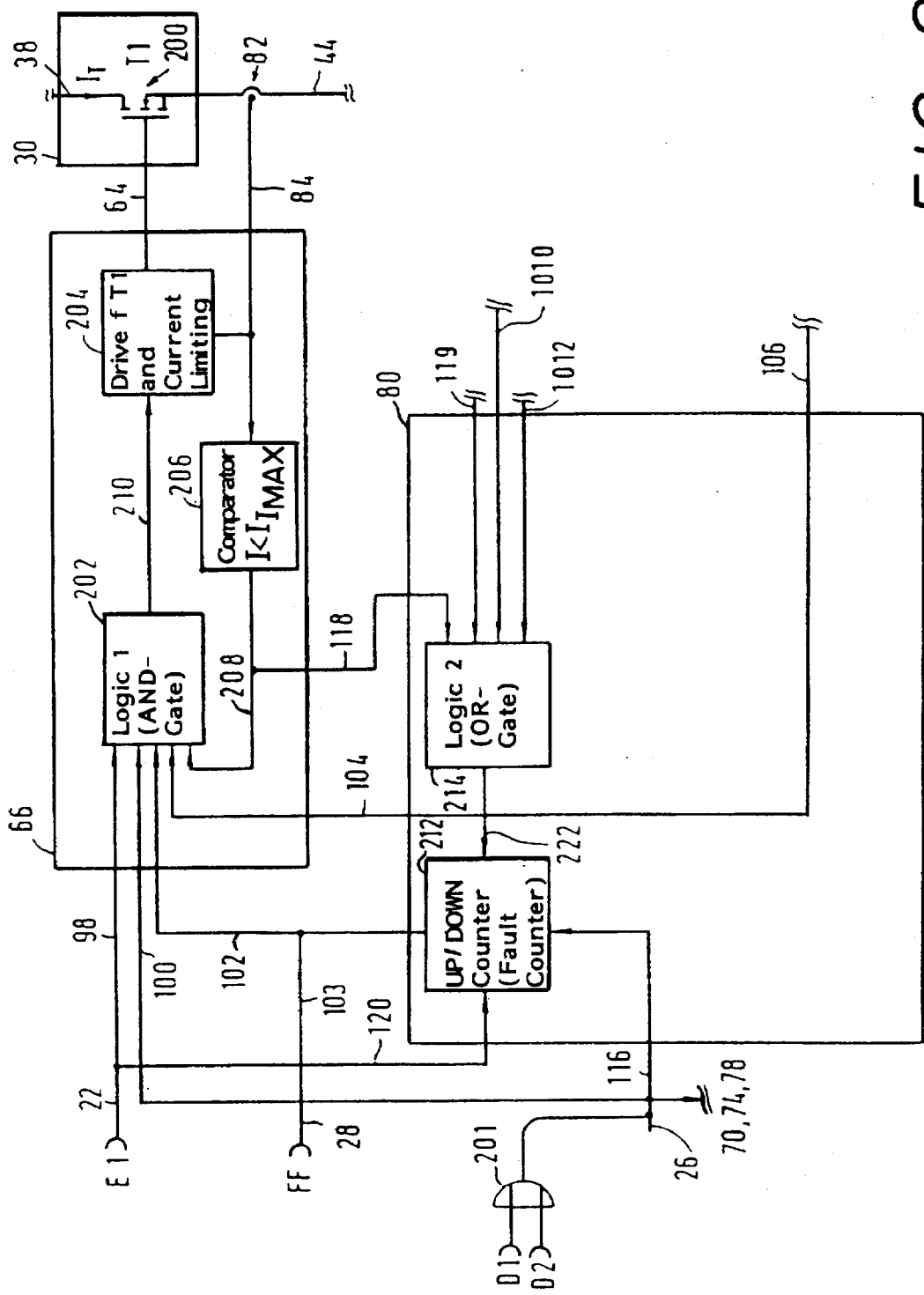
FIG. 2 shows a detailed block circuit diagram of the arrangement of the invention in the context of a first embodiment. A detailed block circuit diagram of the arrangement of the invention is shown in FIG. 3 in the context of a second embodiment.

The procedure of the invention to protect and to monitor the arrangement 12 will be shown below with respect to FIG. 2. FIG. 2 shows a detailed illustration of the monitoring unit 80 as well as the drive element 66. The same elements of FIG. 1 which are in FIG. 2 are identified by the same reference numerals and will not be explained below in greater detail.

Furthermore, it is noted that the configuration of the drive element 66 corresponds to the configurations of the drive elements 70, 74, and 78 which are not shown in FIG. 2 for reasons of clarity. The illustration of the input E2 is likewise not shown in FIG. 2 for reasons of clarity because this input is of no importance in connection with the illustration at switch element 30. For this reason and with respect to switch elements 32 and 34, the input E2 must be connected correspondingly in lieu of input E1.

In the preferred embodiment shown in FIG. 2, the switch element 30 comprises an MOS field-effect-transistor 200 having a gate terminal which is connected to the line 64 and having source and drain terminals connected to lines 38 and 44, respectively. In measuring element 82, the current $I_T$ is detected by the transistor, for example by a component having a resistance and is conducted via the line 84 to the drive element 66. Alternatively, and in an advantageous manner, a so-called current-sensing MOSFET can be utilized as the transistor and this transistor includes a current measuring output.

The drive element 66 is essentially made up of three elements: a logic circuit 202, a drive circuit 204 having current limiting and, if required, a charging pump and a comparator 206. The logic circuit 202 is configured essentially as an AND-gate. The following are connected to the logic circuit 202: the lines 98 from the input E1, the line 100 from the inputs D1 and D2 which are joined in the OR-gate 201, the lines 102 and 104 from the monitoring unit 80 and the output line 208 of the comparator 206. The logic circuit 202 is connected via line 210 to the drive circuit 204. The line 84 is connected to the drive circuit 204 in the same manner as to the comparator 206. The output line of the drive circuit 204 defines the line 64 which connects the drive element 66 to the switch element 30. The output line of the comparator 206 leads, on the one hand, via the line 208 to the logic circuit 202 and, on the other hand, to the monitoring unit 80 via the line 118.

The monitoring unit comprises essentially the following components: incrementing/decrementing means (fault counter) 212 and the logic circuit 214 which is essentially configured as an OR-gate.

The line 120 from input E1 (that is, from the line 98), the line 116 from input D1/D2 (that is, from the line 100) as well as the line 222 from the logic circuit 214 are all connected to the counting means 212. The output line of the counting means 212 (that is, the monitoring unit 80) defines the line 102 which is connected to the drive element 66 (that is, the logic circuit 202). The line 103 leads from line 102 to the output FF of the arrangement 12.

The line 118 from drive element 66 as well as corresponding lines 119, 1010 and 1012 from drive elements 70, 74 and 78, respectively, are all connected to the logic circuit 214.

The line 106 leads as line 104 from the monitoring unit 80 to the drive element 66.

As mentioned above, the preferred embodiment of FIG. 2 is shown only in connection with the switch element 30 and the drive element 66. In a complete illustration, the lines 100, 102 and 104 would not only be connected to drive element 66 but also to the other drive elements 70, 74 and 78. Furthermore, and in a preferred embodiment, the line 122 from input E2 (that is the line 112/114) is connected to the monitoring unit 80 in addition to the line 120 from input E1 (that is, the line 98). These lines are connected to counting means 212, for example, via an OR-connection with the line 120 in order to obtain an even evaluation of the fault states from positive and negative current flowing in the consumer 62.

In the following, the operation of the arrangement of FIG. 2 will be described for a fault-free operation.

The microcomputer 10 generates pulse drive signals which are inverse to each other and which are formed by inversion from a signal in one embodiment and are outputted on the lines 22 and 24 to the inputs E1 and E2 of the component 12. In the fault-free operation, the signals, which are applied to the logic circuit 202, are of such a form that the pulsewidth modulated input signal, which is supplied via the line 98 to the drive element 66, is transmitted further to the line 210. In the drive circuit 204, the pulsewidth modulated drive signal, which is supplied via the line 210, is processed for driving the transistor. For example, the circuit 204 includes a voltage overshoot circuit (charging pump) which ensures the switching on or switching off of the transistor. The transistor is then switched on and switched off in a clocked manner in correspondence to the pulsewidth modulated drive signal. The switch element 34 is switched off and switched on inversely and synchronously with respect thereto. The switch elements 32 and 36 are actuated as shown above by the input signal at the input E2 so that an average current flows through the consumer 62 which corresponds to the pulsewidth of the pulsewidth modulated signal. The positioning is effected with this current.

During operation, various types of faults can occur. Especially dangerous are short circuits or short circuit like fault conditions which can occur, for example, as a short circuit in the consumer 62 or as a short circuit in the supply lines to the consumer 62 to ground or to the operating voltage.

Furthermore, an undefined behavior of the consumer can occur when there is a drop below a pregiven minimum threshold by the operating voltage or by exceeding a maximum threshold of the operating and reference voltages. Furthermore, unwanted operating conditions can occur when there is a thermal load on the component 12.

According to the invention, protective mechanisms are provided in component 12 for the above-mentioned types of faults.

The starting point of short circuit protection is the detection of the current through the switch elements. A current measuring element is assigned to each switch element. In the example of FIG. 2, this is the measuring element 82. The detected current is, on the one hand, connected to the drive element 204 which has a current limiting circuit (for example, realized by diodes) which influences the drive signal in the sense of current limiting to a pregiven maximum value $I_{Tmax}$. This measure rapidly limits the current in the range of 2 to 5 microseconds. Furthermore, the current measured value is supplied to the comparator 206 which compares the current to a pregiven maximum value. If the current exceeds this maximum value or if this current is the same as the maximum value (current limiting), then the comparator 206 changes the signal level at its output. In this way, the logic circuit 202 prevents that the drive signal, which is supplied via the line 98, reaches the line 210.

Thereafter, the fault counter is increased by 1 by the comparator 206 via the line 118 and the logic circuit 214. This slower circuit component then leads to a switchoff of the transistor via the logic circuit 202.

In a preferred embodiment, the maximum values of the current limiting circuit and of the comparator are different in amount with the maximum value of the comparator being less than that of the current limiting.

By switching off the transistor, the current flowing therethrough drops so that the comparator output signal again changes its level. In this way, it is made possible that, with the next pulse of the drive signal, a new switch-on attempt of the transistor is carried out. The drive signal is conducted via the line 98 to the logic circuit 202. If a short circuit is still present, then, according to the above embodiment, the transistor is again switched off and the counter 212 is incremented by 1. If the fault counter reaches a specific value such as 10, then it changes the level on its output line 102 so that, on the one hand, the transistor is permanently switched off via the logic circuit 202, that is, a pulse of the input signal does not lead to another attempt to switch on the switching element and, on the other hand, a fault announcement is transmitted to the microcomputer via the output line 103 and 28. What is significant is that, in this case, not only is the switch element 30 switched off but all switch elements are switched off; whereas, the output signal of the comparator 206 effects only the switch-off of the switch element assigned to this comparator.

In summary, after Imax is exceeded by the current in the transistor, a current limiting is first activated and then the fault counter is set via coupling of the drive signal E1 or E2 with the current comparator.

If the detection is made when switching off the transistor that the fault is no longer present, then the fault counter 212 (if its counter position is greater than 0) is decremented by 1 via the pulse of the drive signal. In this way, an unwanted addition of individual short circuits over a long time interval is prevented which could lead to a switch-off of the component 12.

In another advantageous embodiment, the fault counter is decremented during the next repeat switch-on attempt of the transistor when a fault is no longer present and the counter position is greater than 0.

The comparator output lines 119, 1010 and 1012 of the other switch elements of the full bridge output stage are connected to the logic circuit 214. The logic circuit 214 essentially defines a logic OR-function. Accordingly, each individual fault on one of the transistors leads to influencing the fault counter 212. This means that, in the fault counter, the fault conditions of the switch elements are added; that is, each of the four switch elements can increment the fault counter in the case of a short circuit. This improves the operational reliability considerably because critical fault conditions such as in the area of the consumer lead very rapidly to reactions without it being necessary to limit the availability for individual faults.

The output stage can only be switched on again via the input D1 or D2 which decrements the fault counter via a corresponding flank change by the microcomputer 10 or 11 and the logic circuit 202 is again activated. This can, for example, take place in that the microcomputer evaluates the fault data supplied via the output FF and decides pursuant to pregiven criteria, whether the component 12 should again be switched on or not.

This procedure affords the advantage that short disturbances as caused by disturbing radiation do not lead to switching off the entire output stage.

In the preferred embodiment of an electronic throttle flap control, the output stage is driven at a frequency of approximately 15 to 25 kHz so that the switch-on and switch-off times of the pulsewidth modulated signal can be very short. The presented type of short circuit protection is suitable for this environment. Furthermore, the described method also makes possible the detection of short circuits which occur only in the case of a drive such as, for example, a short circuit of the consumer 62 to ground.

Further protective measures can be provided.

The unit 1014 is supplied with a temperature signal via the line 108. This temperature signal represents the temperature of the component 12. This thermal protection covers the case of a fault wherein the pulsewidth modulated signal drives the switch element 30 within a time less than 2 to 5 microseconds so that the above-described protective mechanism cannot respond. Accordingly, in the switch loop 1022, the temperature signal which is supplied via the line 108, is compared to a threshold value so that a corresponding change of signal follows for an overtemperature. This signal change is conducted via the gate 1024, the line 106 and the line 104 to block the logic circuit 202 and to switch off the switch element 30 as well as the other four switch elements.

An operation of the arrangement for operating voltages outside of a pregiven range can be prevented by conducting the operating voltage via line 107 to the switch loop 1016 which compares the operating voltage to minimum or maximum thresholds. If there is a drop below one these thresholds or one of these thresholds is exceeded, then the output stage is blocked via the gate 1024, the line 106 and the line 104, that is, the drive of the switch element 30 is blocked as well as of the other three switch elements.

In an advantageous embodiment, at overtemperature or overvoltage or undervoltage, the fault counter can be set to a pregiven value which, supplied to the microcomputer, can form a basis for again switching on the output stage so that the microcomputer can again switch on the output stage after a pregiven time, for example, when there is an overtemperature.

These three protective mechanisms can be individually combined or can be combined together with the described short circuit protection. Furthermore, and in a similar manner, the voltage on the charge pump as well as the logic reference voltage can be evaluated.

An integrated component for a full bridge output stage is advantageous for driving an electric motor which component includes at least two inputs E1 and E2 as well as those inputs for connecting the input D1 or D2 and the output FF to the microcomputer and which contains the protection functions shown.

In a preferred embodiment, measures are provided which lead to the switch-off of the current supply of the output stage via the microcomputer in the case of a fault when fault data is transmitted on the line 28.

In FIG. 3, and in the context of a second preferred realization, a further embodiment of the procedure of the invention is shown. The above-described second drive principle is applied for the four switch elements. The switch elements 30 and 36 are activated by the drive signal at input E1 and the switch elements 32 and 34 are actuated via the drive signal of input E2. The pulse-shaped drive signals at the input E1 and E2 can be inverse relative to each other. The inversion of the input signal at the input E1 can be carried out preferably in the microcomputer 10 as well as via corresponding devices in the arrangement 12. The inversion described above of, for example, the signal from the input E1 to drive the switch element 34 is unnecessary.

The elements, described in FIG. 3 with the same reference numerals as in FIGS. 1 and 2, have the same function as explained above and are therefore not described in greater detail. Furthermore, in FIG. 3, switch element and drive element are considered together in one element for reasons of clarity.

The input line 300 from input E1 of the arrangement 12 (not shown) leads to the following: the drive and switch element (30, 66), the drive and switch element (36, 78) and the monitoring unit 80. Likewise, the input line 302 leads from input E2 to the following: drive and switch element (32, 74), drive and switch element (34, 70) and monitoring unit 80. As in FIG. 2, a fault line 102 is connected to each drive and switch element. Furthermore, a line is connected from each drive and switch element to the monitoring unit 80 which displays when the pregiven maximum current is exceeded. These lines 118, 119, 1010 and 1012 are shown in FIG. 1.

Furthermore, the monitoring unit 80 has the following: the input lines 100 and 101 from the inputs D1 and D2, an input line 107 on which a signal is supplied representing an increase above or a drop below pregiven limit values by the battery voltage, a line 108 which supplies a signal which indicates an increase above a pregiven chip temperature, a line 111 which conducts a signal displaying a drop of the voltage on the charge pump of the switch elements 30 and 32 and a line 109 on which a signal is supplied which indicates a drop below a pregiven limit value by the reference voltage supplying the logic components of the output stage.

The principle of the embodiment of the monitoring shown in FIG. 3 is based upon the situation that both half bridges (switch elements 30 and 36/switch elements 32 and 34) are monitored separately from each other. For this purpose, the line 118 and 1012 are connected in the monitoring unit 80 to an OR-gate 304 having output line 306, on the one hand, to time element 308 and, on the other hand, to incrementing input 310 of a counter means 312. The line 300 is connected from input E1 to the decrementing input 314 of counting means 312. The output line 316 of time element 308 as well as the output line 318 of counting means 312 are connected to a further OR-gate 320. The output line 322 of the OR-gate 320 is connected to a third OR-gate 324. The output line 326 of OR-gate 324 is connected to the clock input 328 of the D-flipflop 330. Correspondingly, the line 1010 as well as 119 is connected to an OR-gate 332 with respect to the second half bridge (switch elements 32 and 34). The output line of OR-gate 332 is connected to a time element 336 as well as to the incrementing input 338 of counting means 340. The line 302 is connected from input E2 to the decrementing input 342 of counting means 340. The output line 344 of time element 336 as well as the output line 346 of counting means 340 is connected to an OR-gate 348. The output line 350 of OR-gate 348 is, in turn, connected to the OR-gate 324. A line 352 is connected to the D-input of flipflop 330. The line 352 is clamped to a logic 1. The output line 354 is connected to the output Q of the flipflop 330 and leads to a NOR-gate 356. The second input line 358 of NOR-gate 356 comes from a further OR-gate 360. The input lines 100, 101, 107, 108, 109, 111 are logically connected to each other in the OR-gate 360. The line 358 leads to the reset inputs of the flipflop 330 as well as of the counting means 340 and 312. The output line of the NOR-gate 356 defines the output line 102 of the monitoring unit 80 which, on the one hand, leads to the drive and switch elements while on the other hand, leads to the output FF of the arrangement 12.

The operation of the arrangement of FIG. 3 is described below. Each switch element is preferably configured as a current-sensing FET and transmits an increase above an internally pregiven maximum current via the corresponding output of its drive element. In this way, each switch element is monitored as to overcurrent. If the current through a switch element exceeds the inputted maximum value, then a corresponding signal is transmitted via the lines 118, 1012, 1010 or 119 to the monitoring unit 80. There, the signal is transmitted via the corresponding OR-gate 304, 332, on the one hand, to start the time element 308 or 336 and, on the other hand, to increment the counter 312 or 340. The current through the switch element is then limited to a maximum value in the drive element as shown in FIG. 2. What is essential is that each half bridge has only one time element and one counting means assigned thereto so that overcurrents in the switch elements of a half bridge can be applied individually as well as in combination for fault monitoring. The time element 308 or 336 generates an output signal when the overcurrent signal of one of the switch elements of a half bridge or both switch elements exceeds, in its time-dependent sum, a predetermined value such as 50 microseconds. This output signal is conducted to the clock input 328 of the fault flipflop 330 on the one hand via the line 316, the OR-gate 320, the line 322, the OR-gate 324 and the line 326 and, on the other hand, via the line 344, the OR-gate 348, the line 350, the OR-gate 324 and the line 326. A level change at the output Q is generated in the fault flipflop 330 by the level change at the input 328. This level change leads via the line 354 and the NOR-gate 356 to a level change on the output line 102 and therefore to setting the fault flag FF. The setting of the fault flag FF leads to the switch-off of all switch elements via the line 102 and leads to the fault announcement via the line 28 to the microcomputer 10. The two half bridges are then evaluated alternatively with respect to each other so that a fault can be detected when either one switch element of a half bridge, both switch elements of a half bridge or one switch element in both half bridges is defective. An overcurrent fault condition can however only be detected in accordance with this procedure when the period duration of the clocked drive signal is greater than the time duration pregiven in the time elements 308 or 336. This is so because after the termination of the active phase of the clocked drive signal, the corresponding switch elements are switched off and therefore the overcurrent detection becomes unavailable. In order to establish control over this operating condition, counting means 312 and 340 are provided which are incremented with each detected overcurrent and which are decremented with each drive pulse or a pregiven plurality of drive pulses when no fault is present. For this purpose, the drive frequency can be halved in an advantageous manner so that the fault counter is decremented only with each second period. If the contents of the fault counter exceed the corresponding limit value, then the counting means emit signals via their output lines which lead to the setting of the fault flag FF in the above-described manner.

The fault detection is carried out independently of the drive signal via the time elements. Even when a switch-on signal for the switch elements continuously appears on the inputs E1 or E2 and a short circuit occurs during this condition, then the output stage is switched off after the pregiven time has elapsed and the fault flag is set. The integrated output stage is configured in such a manner that, during the pregiven time of preferably 50 microseconds, the output stage tolerates the current limited to the maximum current. Further functions in addition to the described monitoring measures are provided according to FIG. 3. First, the output stage can be switched off via the inputs D1 and D2 and the fault flag FF can be set via the line 358. Secondly, a flank change on the lines 100 or 101 can lead to resetting of the counters and the flipflop 330 and activate the output stage.

In addition, further monitoring measures are provided which monitor the following as to specific limit values: the operating voltage, the logic reference voltage, the charge pump voltage and the chip temperature. This takes place in separate comparator devices which are not shown in FIG. 3 for reasons of clarity. the operating voltage UBat is monitored as to a lower limit value and, if required, to an upper limit value. If the operating voltage drops below this limit value, then the fault flag FF is set by means of a corresponding signal on the line 107 via the line 358 and the reset input of the flipflop 330. Likewise, the logic reference voltage US is monitored as to a lower limit value. If the reference voltage drops below this limit value, then a corresponding signal on the line 109 switches off the output stage. The monitoring of the charge pump voltage as to a lower limit value leads to the same result and has great significance, as does the monitoring of the operating voltage, especially in the switch-on operation. During the switch-on operation, the operating voltage drops below the limit value whereas the charge pump voltage increases from zero only after switch-on so that this voltage too is below a limit value. In this way, the corresponding signals are generated on the lines 107 and 109 which leads to a resetting of the counters 312, 340 and the flipflop 330. In this way, a defined output state of the output stage is obtained. A further monitoring relates to the chip temperature. If this chip temperature exceeds a specific value, then the output stage is switched off in a manner described above.

In addition to the embodiments described above, the individual monitoring measures described can be utilized in any desired combination. Thus, an output stage can be provided wherein only the time element monitoring is provided or only the fault counter monitoring is provided. Furthermore, output stages can be provided which undertake monitoring of half bridges or monitoring of individual switch elements. Furthermore, it is not necessary to activate the output stage via external inputs or, with respect to monitoring operating variables of the output stage, the suitable variables can be selected. Also, each switch element can be assigned a time element and/or a fault counter.

We claim:

1. An arrangement for operating a consumer in a vehicle, the arrangement comprising:

at least two switch elements operatively connected to said consumer through which a current can flow;

microcomputer means for generating at least one drive signal to actuate said switch elements to influence said current through said consumer;

a monitoring device for monitoring the operability of said arrangement and said monitoring device including: detecting means for detecting the respective currents through said switch elements; means for providing a pregiven value for said currents; and, monitoring means for monitoring the respective currents through said switch elements to determine when said currents reach or exceed said pregiven value;

limiting means for limiting the current through at least one of said switch elements to a maximum value when said current through said one switch element exceeds said pregiven value; and, circuit means for switching off said switch element when said current through said one switch element has exceeded said pregiven value for a pregiven time duration.

2. The arrangement of claim 1, wherein said drive signal is a pulsewidth modulated signal which is supplied to the particular switch element via drive elements.

3. The arrangement of claim 1, further comprising: a full bridge output stage with each half bridge being assigned a time element and/or counting means and faults are detected when the maximum current is exceeded in one or both switch elements.

4. The arrangement of claim 1, wherein said two switch elements define an output stage connected to said consumer; and, said circuit means being adapted to switch off said output stage when said pregiven value through at least one of said switch elements is exceeded for said pregiven time duration.

5. An arrangement for operating a consumer in a vehicle, the arrangement comprising:

at least two switch elements operatively connected to said consumer through which a current can flow;

microcomputer means for generating at least one drive signal to actuate said switch elements to influence said current through said consumer;

a monitoring device for monitoring the operability of said arrangement and said monitoring device including: detecting means for detecting the respective currents through said switch elements; means for providing a pregiven value for said currents; and, monitoring means for monitoring the respective currents through said switch elements to determine when said currents reach or exceed said pregiven value;

limiting means for limiting the current through at least one of said switch elements to a maximum value when said current through said one switch element reaches or exceeds said pregiven value;

circuit means for switching off said switch element when said current through said one switch element has reached or exceeded said pregiven value for a pregiven time duration;

said drive signal being a pulsewidth modulated signal which is supplied to the particular switch element via drive elements;

said drive elements being so configured that, when the current flowing through the particular switch element exceeds said pregiven value, an internal current limiting is undertaken by influencing said drive signal.

6. The arrangement of claim 5, wherein said arrangement further comprises counting means which is incremented by 1 and/or a time element which is started when said maximum value is exceeded by the current through said one switch element.

7. The arrangement of claim 6, wherein the particular switch element is again switched on with the next drive pulse of the drive signal when a fault state of the switch element is detected.

8. The arrangement of claim 7, wherein the arrangement further comprises counting means which is decremented by 1 by the drive pulses when a fault state is not present.

9. The arrangement claim 8, wherein a fault signal is generated when said counting means position exceeds a predetermined value and/or when a pregiven time has elapsed, which leads to a complete switch-off of said arrangement.

10. The arrangement of claim 9, wherein protection against overtemperature, undervoltage or overvoltage of the operating voltage and/or the logic reference voltage is provided and protection against undervoltage of a charging pump driving the switch elements is provided.

11. The arrangement of claim 10, wherein switching said arrangement on again is provided by the microcomputer.

12. An arrangement for operating a consumer in a vehicle, the arrangement comprising:

at least two switch elements operatively connected to said consumer through which a current can flow;

microcomputer means for generating at least one drive signal to actuate said switch elements to influence said current through said consumer;

a monitoring device for monitoring the operability of said arrangement and said monitoring device including: detecting means for detecting the respective currents through said switch elements; means for providing a pregiven value for said currents; and, monitoring means for monitoring the respective currents through said switch elements to determine when said currents reach or exceed said pregiven value;

limiting means for limiting the current through at least one of said switch elements to a maximum value when said current through said one switch element reaches or exceeds said pregiven value; and, circuit means for switching off said switch element when said current through said one switch element has reached or exceeded said pregiven value for a pregiven time duration and a fault is detected when said maximum current is exceeded and said fault is stored in a fault memory which can be reset and which can be reset by said microcomputer means.

13. An arrangement for operating an electric motor in a vehicle, the arrangement comprising:

a full bridge output stage for driving an electric motor;

said output stage including switch elements;

a microcomputer for supplying a pulsewidth modulated pulse-shaped drive signal to said output stage;

means for detecting the respective currents in said switch elements and for monitoring said currents to determine when said currents exceed a pregiven value;

said arrangement defining an integrated component including: a drive input; an enable/disable input; terminals for said electric motor and an output for fault data; and, means for coupling to said microcomputer;

means for limiting the current through one of said switch elements when the current through said one switch element has exceeded said pregiven value; and, switch-off means for switching off said one switch element of said output stage when the current through said one switch element has exceeded the maximum current therein for a pregiven time duration.

14. The arrangement of claim 13, wherein said electric motor actuates a power control element of an internal combustion engine.

15. The arrangement of claim 14, wherein said power control element is a throttle flap.

16. The arrangement of claim 14, wherein said power control element is an injection pump.

* * * * *

UNITED STATES PATENT AND TRADEMARK OFFICE
CERTIFICATE OF CORRECTION

PATENT NO. : 5,723,958
DATED : March 3, 1998
INVENTOR(S) : Leonhard Boll and Klaus Mueller It is certified that error appears in the above-identified patent and that said Letters Patent is hereby corrected as shown below:

```
In column 5, line 30: under the table, please insert
-- X (desired); 0,1 (logic level); E (switched on); A (switched off) --.
```

Signed and Sealed this

Twenty-second Day of June, 1999

Attest:

Attesting Officer

Q. TODD DICKINSON

Acting Commissioner of Patents and Trademarks